United States Patent
Levine

(10) Patent No.: US 6,634,669 B2
(45) Date of Patent: *Oct. 21, 2003

(54) VEHICLE AIR BAG MINIMUM DISTANCE ENFORCEMENT APPARATUS, METHOD AND SYSTEM

(75) Inventor: Richard W. Levine, Chappaqua, NY (US)

(73) Assignee: Vehicle Safety Systems, Inc., Valhalla, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/897,536

(22) Filed: Jul. 2, 2001

(65) Prior Publication Data

US 2002/0074785 A1 Jun. 20, 2002

Related U.S. Application Data

(63) Continuation of application No. 09/220,832, filed on Dec. 24, 1998, now Pat. No. 6,293,584.
(60) Provisional application No. 60/105,595, filed on Oct. 26, 1998, provisional application No. 60/105,245, filed on Oct. 22, 1998, and provisional application No. 60/101,487, filed on Sep. 23, 1998.

(51) Int. Cl.[7] .......................... B60N 2/06; B60R 21/00; G05G 1/14
(52) U.S. Cl. ........................ 280/735; 296/68.1; 701/49; 74/512
(58) Field of Search .......................... 280/735; 701/49; 74/512, 513, 514; 296/68.1

(56) References Cited

U.S. PATENT DOCUMENTS 3,691,868 A 9/1972 Smuith (List continued on next page.)

FOREIGN PATENT DOCUMENTS

DE 26 44 626 A1 4/1977

(List continued on next page.)

OTHER PUBLICATIONS

B. Chapin, "Demand Stretches Supplier. Adjustable Pedals Are Hot Sellers", Automotive News, Jul. 15, 1999, 1 page.

PCT Search Report for PCT/US99/21794, mailed on Apr. 11, 2000.

*Primary Examiner*—Peter C. English
(74) *Attorney, Agent, or Firm*—Kenyon & Kenyon

(57) ABSTRACT

A vehicle safety device includes a seat mounted within a passenger compartment of the vehicle, in which the seat is movably connected to a vehicle frame by a seat position adjusting mechanism that allows the seat to move along an axis between a forward-most position and a rearward-most position. An air-bag is mounted within the passenger compartment in front of the forward-most position of the seat, with the forward-most position of the seat defined as a position of the seat in which a distance between a passenger seated in the seat and the air-bag is equal to a minimum safe clearance. In addition, an exemplary method of maintaining a minimum safe clearance between an air-bag mounted in a vehicle and a vehicle passenger includes the steps of preventing motion of a seat toward the air-bag beyond a forward-most position, in which, when in the forward-most position, a passenger seated in the seat is separated from the air-bag by a predetermined minimum safe clearance, and providing a position adjusting mechanism for at least one vehicle control pedal to allow a passenger seated in the seat to adjust a distance between the seat and the at least one pedal by moving the at least one pedal toward and away from the seat. An automatic seat positioning system, which takes into account both seat to air-bag distance and eye height, may be used to optimally and automatically position a passenger to maximize safety and comfort.

22 Claims, 9 Drawing Sheets

U.S. PATENT DOCUMENTS

| | | | |
|---|---|---|---|
| 3,975,972 A | 8/1976 | Muhleck | |
| 4,870,871 A | 10/1989 | Ivan | |
| 5,071,160 A | 12/1991 | White et al. | |
| 5,074,583 A | 12/1991 | Fujita et al. | |
| 5,330,226 A | 7/1994 | Gentry et al. | |
| 5,413,378 A | 5/1995 | Steffens, Jr. et al. | |
| 5,446,661 A | 8/1995 | Gioutsos et al. | |
| 5,461,939 A | 10/1995 | Upton | |
| 5,466,001 A | 11/1995 | Gotomyo et al. | |
| 5,490,069 A | 2/1996 | Gioutsos et al. | |
| 5,531,472 A | 7/1996 | Semchena et al. | |
| 5,626,359 A | 5/1997 | Steffens, Jr. et al. | |
| 5,653,462 A | 8/1997 | Breed et al. | |
| 5,678,854 A | 10/1997 | Meister et al. | |
| 5,683,103 A | 11/1997 | Blackburn et al. | |
| 5,702,123 A | 12/1997 | Takahashi et al. | |
| 5,722,302 A | 3/1998 | Rixon et al. | |
| 5,771,752 A | 6/1998 | Cicotte | |
| 5,803,491 A | 9/1998 | Barnes et al. | |
| 5,819,593 A | 10/1998 | Rixon et al. | |
| 5,822,707 A | 10/1998 | Breed et al. | |
| 5,839,326 A | 11/1998 | Song | |

FOREIGN PATENT DOCUMENTS

| | | |
|---|---|---|
| DE | 29 41 345 A1 | 4/1981 |
| DE | 40 23 109 A1 | 1/1992 |
| DE | 44 00 934 C1 | 1/1994 |
| DE | 43 41 500 A1 | 6/1994 |
| DE | 44 06 897 C1 | 5/1995 |
| DE | 196 54 705 A1 | 7/1997 |
| DE | 196 37 108 A1 | 3/1998 |
| JP | 48-7414 | 1/1973 |
| JP | 50-6694 | 3/1975 |
| JP | 51-22218 | 2/1976 |
| JP | 52-44923 | 4/1977 |
| JP | 57-182531 | 11/1982 |
| JP | 61-94829 | 5/1986 |
| JP | 62-5700 | 2/1987 |
| JP | 62-25768 | 7/1987 |
| JP | 63-34254 | 2/1988 |
| JP | 63-49528 | 3/1988 |
| JP | 2-39214 | 2/1990 |
| JP | 2-129710 | 5/1990 |
| JP | 4-138939 | 5/1992 |
| JP | 6-63262 | 8/1994 |
| JP | 7-96784 | 4/1995 |
| JP | 7-96785 | 4/1995 |
| JP | 7-96786 | 4/1995 |
| JP | 7-96787 | 4/1995 |
| JP | 7-125614 | 5/1995 |
| JP | 7-125616 | 5/1995 |
| JP | 7-164934 | 6/1995 |
| JP | 7-164935 | 6/1995 |
| JP | 7-191773 | 7/1995 |
| JP | 7-191774 | 7/1995 |
| JP | 7-223519 | 8/1995 |
| JP | 7-271464 | 10/1995 |
| JP | 7-334261 | 12/1995 |
| JP | 7-334262 | 12/1995 |
| JP | 8-22338 | 1/1996 |
| JP | 8-30346 | 2/1996 |
| JP | 9-301010 | 11/1997 |

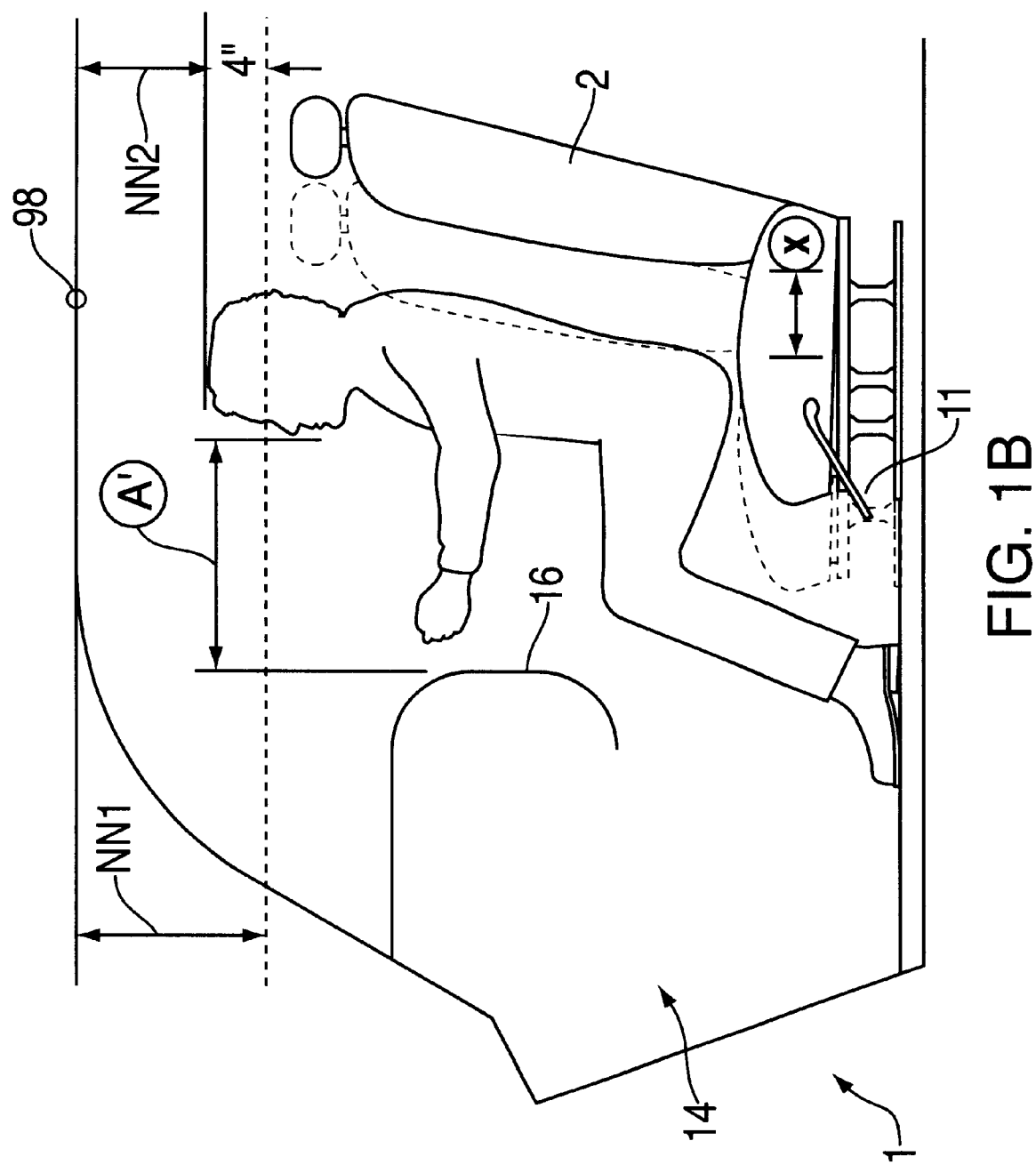

VEHICLE AIR BAG MINIMUM DISTANCE ENFORCEMENT APPARATUS, METHOD AND SYSTEM

RELATED APPLICATION INFORMATION

This application is a continuation of U.S. patent application Ser. No. 09/220,832, filed Dec. 24, 1998, U.S. Pat. No. 6,293,584, which claims priority to: U.S. Provisional Application No. 60/101,487, filed Sep. 23, 1998; U.S. Provisional Application No. 60/105,245, filed Oct. 22, 1998; and U.S. Provisional Application No. 60/105,595, filed Oct. 26, 1998.

FIELD OF THE INVENTION

The present invention relates to safety systems and methods for vehicles and more particularly relates to vehicle air-bag systems which, in operation, take into account a clearance between a vehicle passenger and an air-bag.

BACKGROUND INFORMATION

Although statics may indicate that vehicle equipped with air-bags have enhanced passenger safety, under certain conditions air-bags may have been identified as a source of passenger injuries and may have even been cited in some cases as causing death. As understood, deaths may have been attributed to air-bags predominantly in low-speed accidents, and air-bags may have also been a factor in deaths resulting from high-speed accidents.

A number of these injuries may have involved shorter drivers (more specifically, drivers 5' 0" or less in height) who adjust the seat position so that a distance between the air-bag and the driver are reduced below a safe clearance. Drivers taller than 5' 0" may also position themselves within the minimum safe clearance and this positioning is dangerous regardless of the height of the driver. In certain systems, as all of the adjustment for drivers of various sizes is generally done through seat movement, shorter drivers may be positioned much closer to the steering wheel (and the air-bag contained therein) than are taller drivers. As indicated above, this may often result in shorter drivers (such as, for example, 5' 0" or less in height), along with taller drivers who chose to sit close to the steering wheel being positioned within a predetermined safe clearance. Depending on the air-bag system used, the safe clearance may vary. A 10" clearance between the driver and the air-bag may usually be sufficient to eliminate certain of any negative effects of air-bag systems.

Conventional seats may generally allow adjustment of the driver's seat between a rearward-most position and a forward-most position separated by a distance sufficient to accommodate the range of leg lengths in the adult population, such as, for example, approximately 8". It is believed that these systems may primarily address differences in leg length as differences in arm and torso length among the population are less substantial.

Thus, to operate the pedals in prior systems, shorter adults were forced to move the seat forward, often to the forward-most position while a portion of taller adults also chose to move the seat beyond the safe clearance. This causes a corresponding distance closure between the drivers chest and head and the steering wheel in which the air-bag is often located. Thus, when the seat is in the forward-most position, a driver will be separated from the steering wheel by a distance less than the required minimum safe clearance. This problem may have been addressed by systems that determine when the driver is positioned closer than the minimum safe clearance and then adjust or suspend air-bag operation. In addition to disabling air-bags when the clearance is unsafe, prior systems have slowed the rate of air-bag inflation or inflated the air-bag in stages. These systems, however, may deprive shorter drivers of the full effectiveness of the air-bag system.

Other areas of concern are in the appropriate use of reduced inflation bags and in post-crash escape and rescue actions. Seat belts, automatic door locks and electric windows often become liabilities following severe impact, rollover, or in submerged vehicle situations.

It is believed, however, that little attention has been paid to computerized safety automation and post-crash escape as they relate to these features. Rather, industry efforts have been directed to manual devices such as the "Pointed Window Breaking Hanmmer" now offered as a car safety accessory to expedite escape.

SUMMARY OF THE INVENTION

An exemplary embodiment and/or exemplary method of the present invention is directed to a vehicle safety device including a seat mounted within a passenger compartment of the vehicle, in which the seat is movably connected to a vehicle frame by a seat position adjusting mechanism which allows the seat to move along an axis between a forward-most position and a rearward-most position. An air-bag is mounted within the passenger compartment in front of the forward-most position of the seat, with the forward-most position of the seat defined as a position of the seat in which a distance between a passenger seated in the seat and the air-bag is equal to a minimum safe clearance.

The present invention is also directed to a method of maintaining a minimum safe clearance between an air-bag mounted in a vehicle and a vehicle passenger including the steps of preventing motion of a seat toward the air-bag beyond a forward-most position wherein, when in the forward-most position, a passenger seated in the seat is separated from the air-bag by a predetermined minimum safe clearance and providing a position adjusting mechanism for at least one vehicle control pedal to allow a passenger seated in the seat to adjust a distance between the seat and the at least one pedal by moving the at least one pedal toward and away from the seat.

BRIEF DESCRIPTION OF THE DRAWINGS

FIG. 1B shows a passenger side view of a passenger compartment of a vehicle equipped with a vehicle safety system according to a first exemplary embodiment of the present invention.

DETAILED DESCRIPTION

Figure 1A:
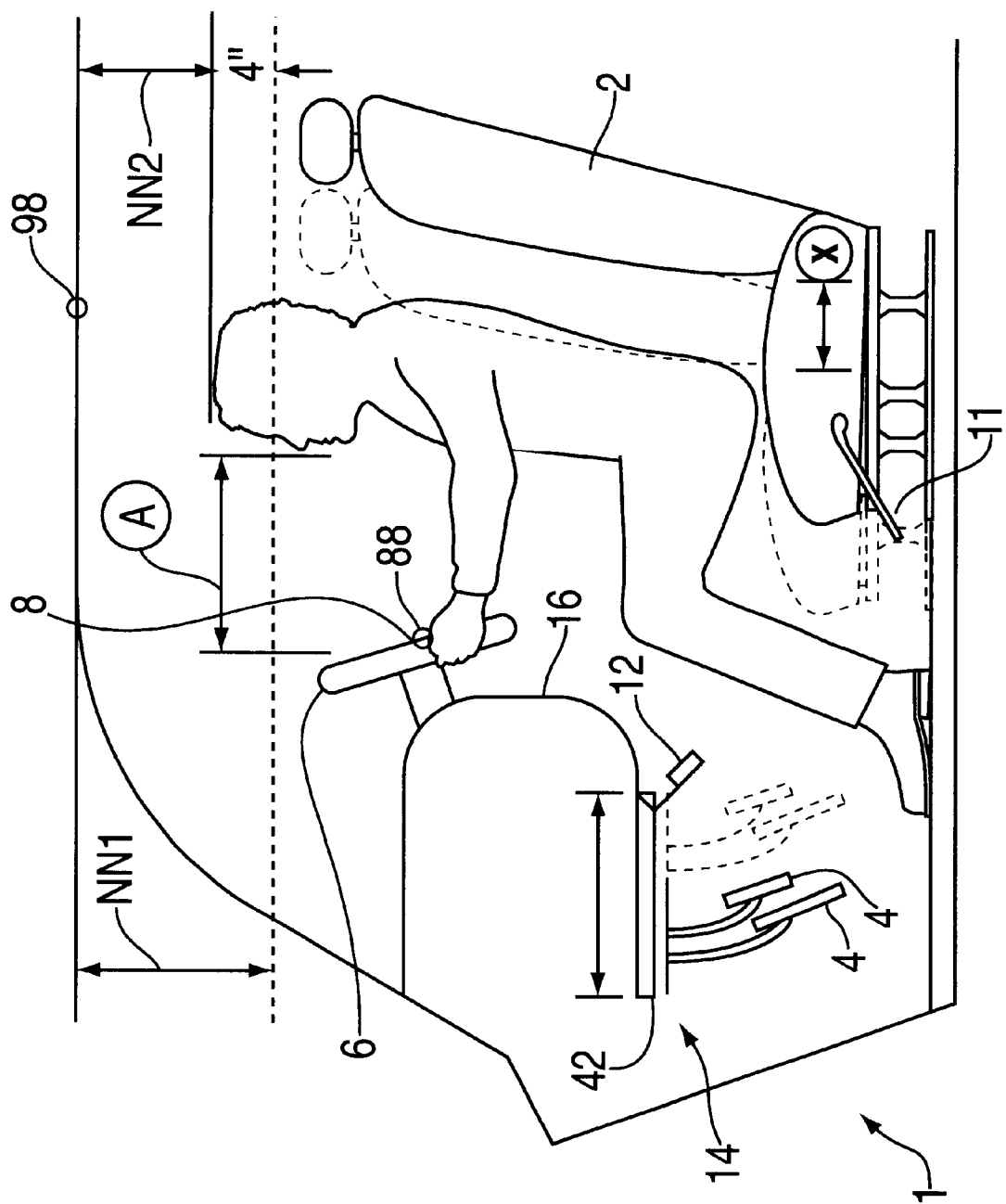
FIG. 1A shows a driver side view of a passenger compartment of a vehicle equipped with a vehicle safety system according to a first exemplary embodiment of the present invention.

FIG. 1A shows a system according to an exemplary embodiment of the present invention in which a driver positioned on a seat 2 adjusts the position of the seat 2 to a desired position between rearward and forward-most positions separated by a distance X. Then, the driver adjusts the position of the pedals 4 so that, when in the desired seat position, the driver can comfortably reach the pedals 4 (accelerator, brake, clutch, etc.). Any suitably appropriate manual or automatic seat positioning mechanism may be employed in a vehicle safety device according to the exemplary embodiment and/or exemplary method of the present invention. For example, a seat position adjusting mechanism may include a lever 11 which, in a first position, prevents the seat 2 from moving forward and rearward and which, in a second position, releases the seat 2 so that the seat 2 may be moved forward and rearward by a passenger seated in the seat 2.

A vehicle safety system according to the exemplary embodiment of the present invention limits the motion of the seat 2 toward the steering wheel 6 or other point of deployment of an air-bag 8 so that a distance A between the driver and the air-bag 8 is at least a minimum safe clearance. Thereafter, the remainder of any further reduction of the distance between the driver and the pedals 4 is achieved by a rearward adjustment of the position of the foot pedals 4.

By providing limited adjustment of the position of the seat 2, drivers may still adjust for the relatively smaller variations in chest depth and arm length while the adjustment of the position of the pedals 4 allows for the larger adjustments necessary to accommodate differences in leg length.

The minimum safe clearance may be maintained by limiting seat back motion toward the steering wheel 6 center to a distance equal to the minimum safe clearance plus a value for a minimum adult chest depth (such as, for example, approximately 8"). Thus, for a 10" minimum safe clearance and using 8" for the minimum adult chest depth, the seat 2 would be prevented from moving forward past a point where the seat back is 18" from the steering wheel 6. In such a system, as pedal position adjustment allows for the greater difference in leg length, a distance between the forward-most and rearward-most positions of the seat, allowing only for the lesser differences between chest depth and arm length, could be reduced to approximately 2½". Then, providing 6" of adjustment between forward-most and rearward-most positions of the foot pedals 4 makes available to the driver of such a vehicle an amount of total adjustment of the distance between the driver and the pedals 4 comparable to that provided in previous systems. Although distances between the driver and the steering wheel 6 are being discussed as examples, the only distance that matters is that between an occupant of the vehicle (driver or passenger) and the air-bag cover which is a distance A from the steering wheel located air-bag for the driver of FIG. 1A and which is a distance A' from the dashboard located air-bag for the passenger of FIG. 1B.

Figure 2:
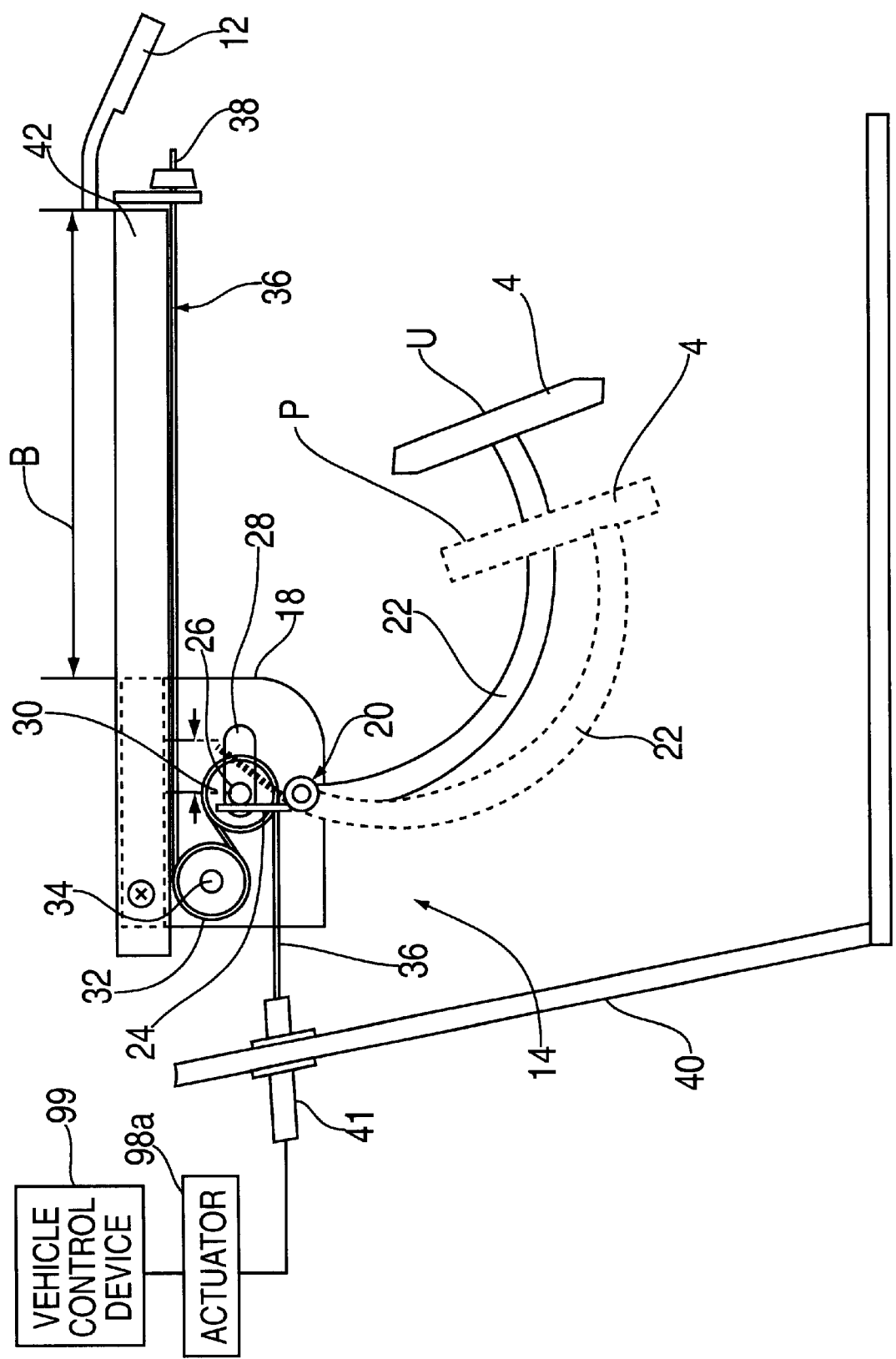
FIG. 2 shows a partially cross-sectional side view of a first pedal position adjustment apparatus for use with the first embodiment of the invention.

FIG. 2 shows a manual system for pedal position adjustment which operates similarly to the mechanisms in use for manual adjustment of seat position. When a lever 12 is moved into a release position, a pedal slide mechanism 14 coupled between the frame of the vehicle I and the pedals 4 is released into an unlocked configuration in which a pedal slide housing 18 and, consequently, the pedals 4 may be slid forward and rearward relative to the vehicle dashboard 16 (FIG. 1) to a desired position. When the lever 12 is moved from the release position to a locked position, the pedal slide housing 18 is locked into the desired position. Of course, the lever 12 may be biased toward the locked position, such as, for example, by a spring, so that the lever 12 automatically returns to the locked position when released. If desired, individual pedals 4 may be mounted to separate pedal slide mechanisms 14 thereby allowing each pedal 4 to be adjusted to an optimum position. Alternatively, the pedals 4 may be coupled together for motion forward and rearward in unison so that a predetermined relative positioning of the pedals 4 is maintained.

The pedal 4 of FIG. 2 is pivotally coupled to a slide housing 18 for rotation about an axle 20 with an upper extension 24 of the pedal bar 22. The upper extension 24 abuts a first pin 26 which is slidably received in a channel 28 formed in the slide housing 18 and a first pulley 30 is pivotally mounted on the first pin 26. A second pulley 32 is pivotally mounted on a second pin 34 which is fixedly coupled to the slide housing 18 and a cable 36 extends from an anchor 38, around the first and second pulleys 30, 32, through a firewall 40 via a conduit 41 to an actuator 98a which operates a vehicle control device 99, such as, for example, clutch, brake or accelerator.

The letter P in FIG. 2 indicates the position of the pedal 4 in a pressed position while the letter U indicates the position of the pedal 4 in an unpressed position. When in the unpressed position U, the upper extension 24 extends substantially vertically so that the first pin 26 and the first pulley 30 are positioned at the front of the channel 28 as the pedal 4 is biased into the unpressed position U by, for example, a spring or other known mechanism. In the unpressed position U with the first pulley 30 at the front of the channel 28, a portion of the cable 36 extending between the anchor 38 and the first pulley 30 is at a minimum length thereby operating the actuator into a configuration corresponding to the unpressed condition of the pedal 4. When the pedal 4 is depressed to the pressed position P, the upper extension 24 rotates (clockwise as seen in FIG. 2) to the position indicated by the dashed line pushing the first pin 26 and the first pulley 30 rearward in the channel 28 and increasing the length of the portion of the cable 36 which extends between the first pulley 30 and the anchor 38. This draws the actuator into a configuration corresponding to the pressed position P of the pedal 4.

The slide housing 18 is slidably mounted to a channel member 42 which is rigidly coupled to a lower surface of the dashboard 16 or bracketed to the firewall 40 for motion between forward-most and rearward-most pedal positions separated by a distance B. Regardless of the position of the slide housing 18 along the channel member 42, the total cable length from the firewall 40 to anchor 38 remains constant and, therefore, the action of the cable 36 on the actuator will be unchanged by an adjustment of the position of the slide housing 18. Thus, the position of the pedal 4 may be adjusted forward and rearward without affecting the operation of the actuator or the corresponding vehicle control device.

Figure 3:
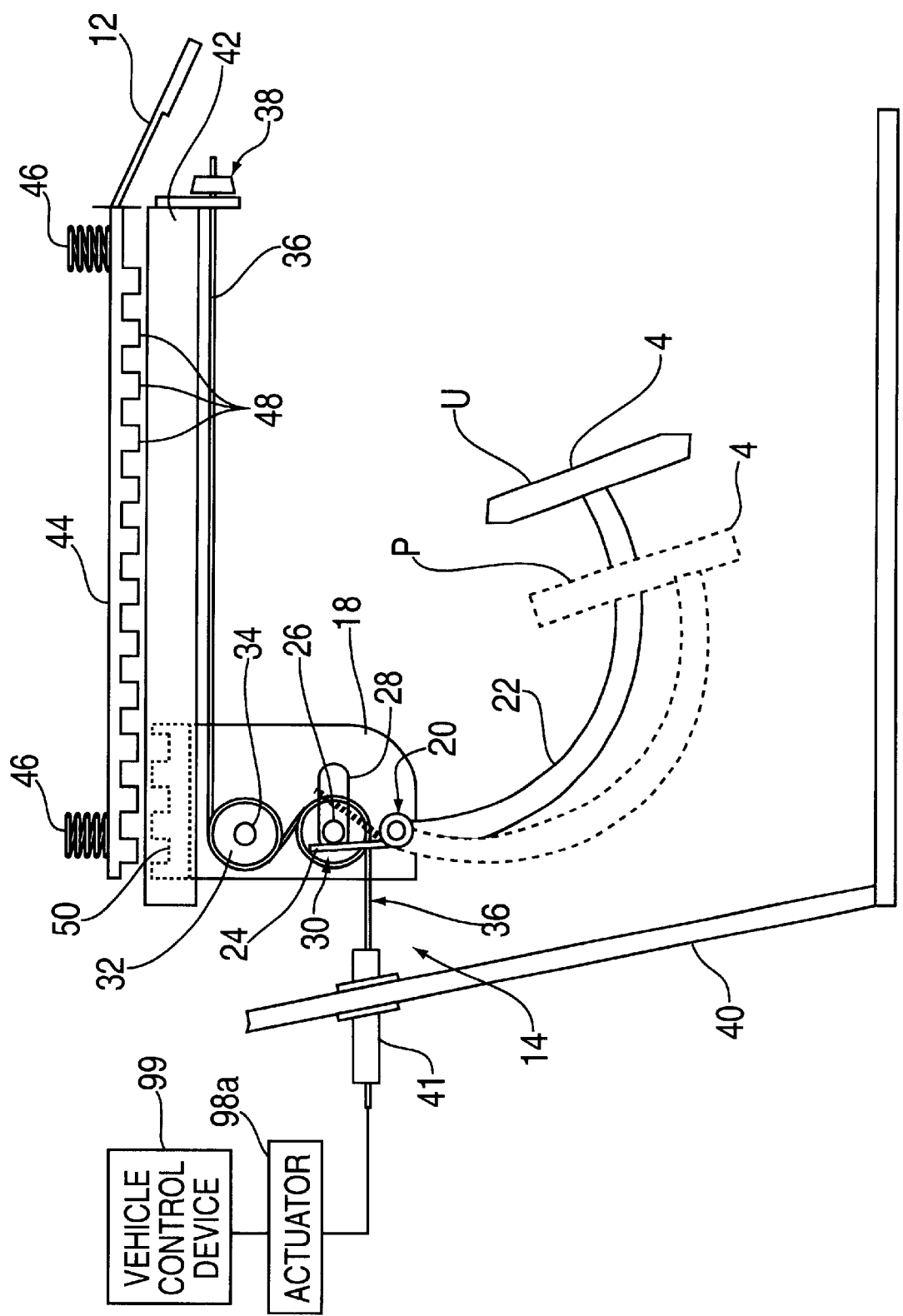
FIG. 3 shows a partially cross-sectional side view of a second pedal position adjustment apparatus for use with the first embodiment of the invention.

FIG. 3 shows an adjustable pedal position mechanism substantially similar to that of FIG. 2 except that the slide housing 18 extends further vertically with the first pulley 30 arranged below the second pulley 32 as opposed to the lateral arrangement depicted in FIG. 2 and, in addition, FIG. 3 shows a mechanism for locking the pedal slide mechanism 14 in a desired position. In addition, FIG. 3 shows an exemplary mechanism for locking the slide housing 18 and, consequently, the pedal 4 in a desired position along the channel member 42. The locking mechanism includes a ridged plate 44 biased toward an upper surface of the slide housing 18 by springs 46. The ridged plate 44 includes a plurality of projections 48 sized to be received in recesses 50 formed in an upper surface of the slide housing 18. The ridged plate 44 is coupled to the lever 12 so that, when the lever 12 is pulled upward, the ridged plate 44 is disengaged from the slide housing 18 and the slide housing 18 may be freely slid forwardly and rearwardly along the channel 42. Then, when the lever 12 is released after adjusting the pedal 4 to the desired position, springs 46 move the ridged plate 44 down into engagement with the recesses 50 of the slide housing 18 to maintain the slide housing 18 in the desired position. The above-described locking mechanism is exemplary only and that any number of known mechanisms may be used to lock the channel in the desired position.

Figure 4:
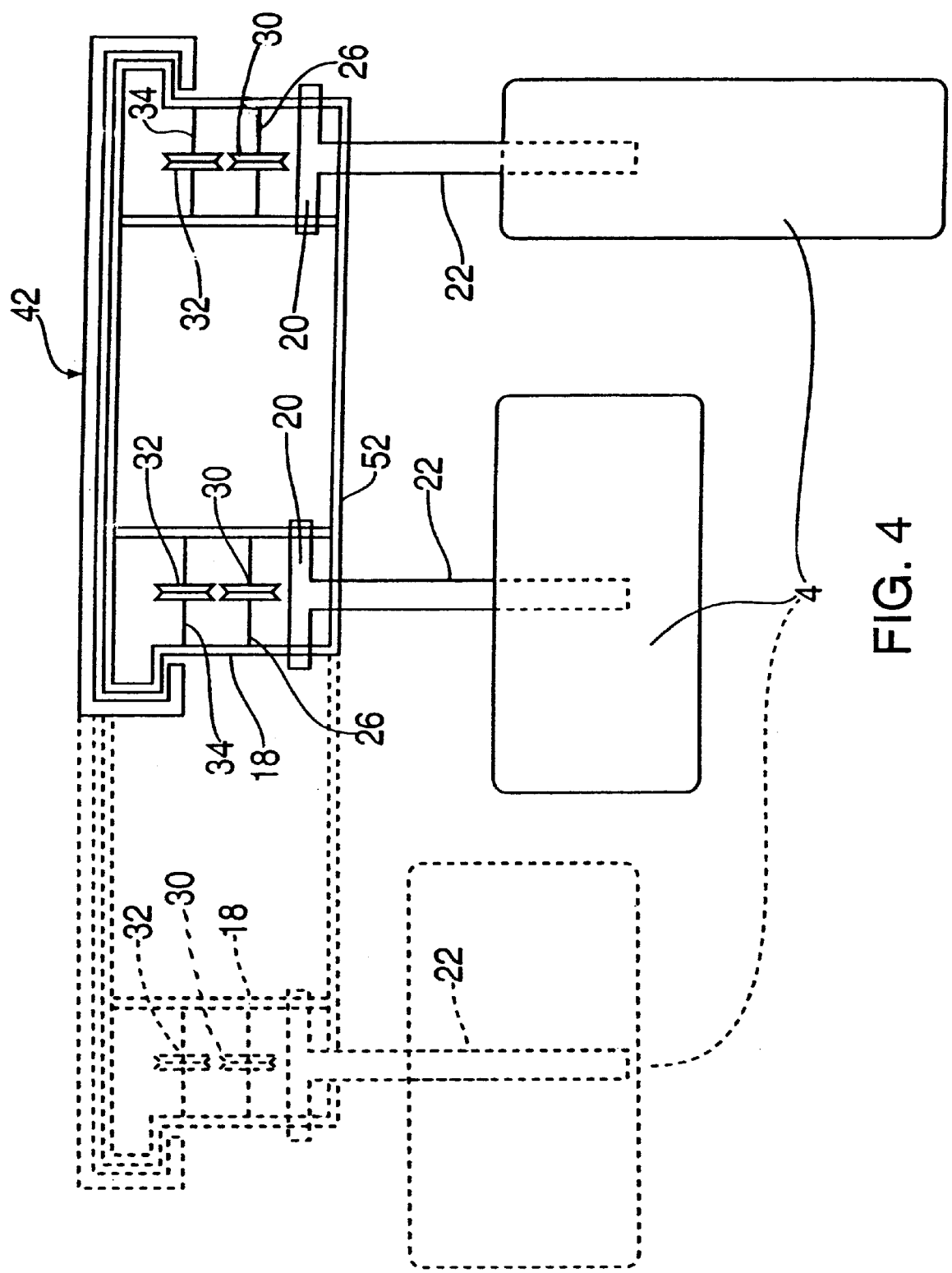
FIG. 4 shows a partially cross-sectional front view of the pedal position adjustment apparatus of FIG. 3.
Figure 5:
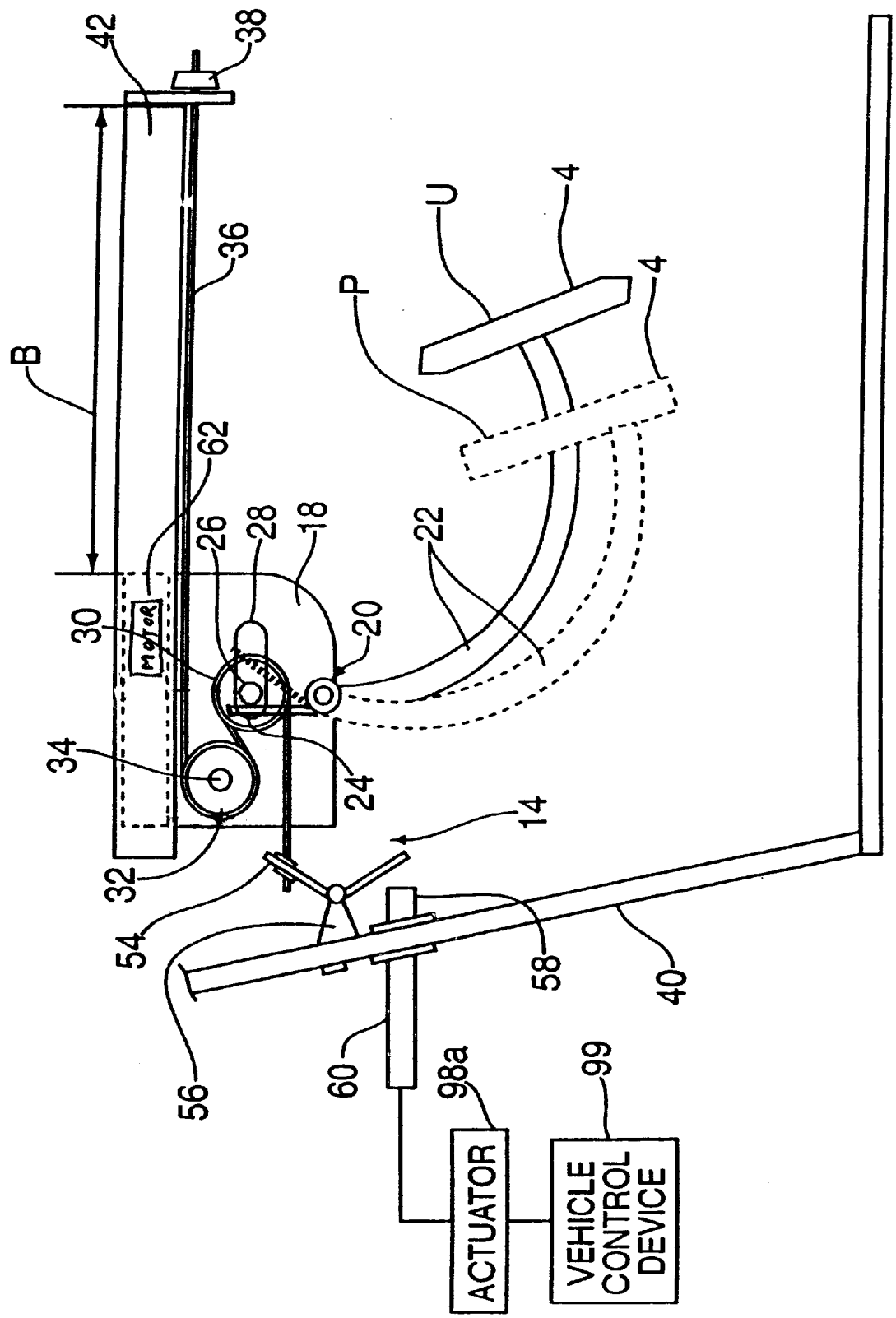
FIG. 5 shows a partially cross-sectional side view of a third pedal position adjustment apparatus for use with the first embodiment of the invention.

FIG. 4 shows a partially cross-sectional front view of the adjustable pedal position mechanism of FIG. 3 showing two pedals 4 mounted to slide housings 18 which are rigidly coupled to one another via a connecting member 52 so that the position of both pedals 4 relative to one another is maintained constant as the adjustable pedal position mechanism is operated to achieve a desired pedal position. As indicated by the third pedal 4 shown in dotted lines in FIG. 4, any number of pedals may be interlinked for common forward and rearward motion with this mechanism. In the alternative, additional pedals may be de-linked from the first two pedals to allow independent positioning thereof. In addition, one or more slide housings 18 may be formed as a single one-piece unit together with the corresponding connecting members 52 so that the unit as a whole moves along the channel 42. FIG. 5 shows an alternative embodiment of the adjustable pedal position mechanism of FIG. 2 which incorporates structure essentially identical to that of FIG. 2 except that the cable 36 is coupled at one end to the anchor 38 while the other end of the cable 36 is coupled to a lever 54 which is pivotally coupled to the fire wall 40 via a mount 56. The lever 54 is positioned adjacent a member 58 which, when depressed, may operate an electric switch sending a signal corresponding to a degree of depression of the pedal 4 to the vehicle control device via the actuator 98a which actuates a vehicle control device as is known in the art. In addition, the adjustable pedal position mechanism of FIG. 5 is coupled, for example via a worm gear (not shown) to a servo motor 62 for automatically adjusting the position of the pedal 4. Specifically, the servo motor 62 operates based on input from the driver to move the pedal 4 forward or rearward to the desired position and to lock the pedal 4 in the desired position. Alternatively, the servo motor may be operated based on memory stored in a CPU of a vehicle control system to select a predetermined pedal position (or pedal and seat position) based on predetermined preferences for the current driver. Of course, for such systems with the pedal position adjusted in accord with commands from a CPU, the seat position and pedal position may be automatically controlled in accord with criteria stored in a memory to ensure that the minimum safe clearance is maintained.

As a substitute for the servo motor 62 of FIG. 5, any suitable automatically operable power source may be employed to automatically adjust the position of the pedals 4 employing any number of suitable mechanisms such as those employed, for example, with powered seats.

Figure 6:
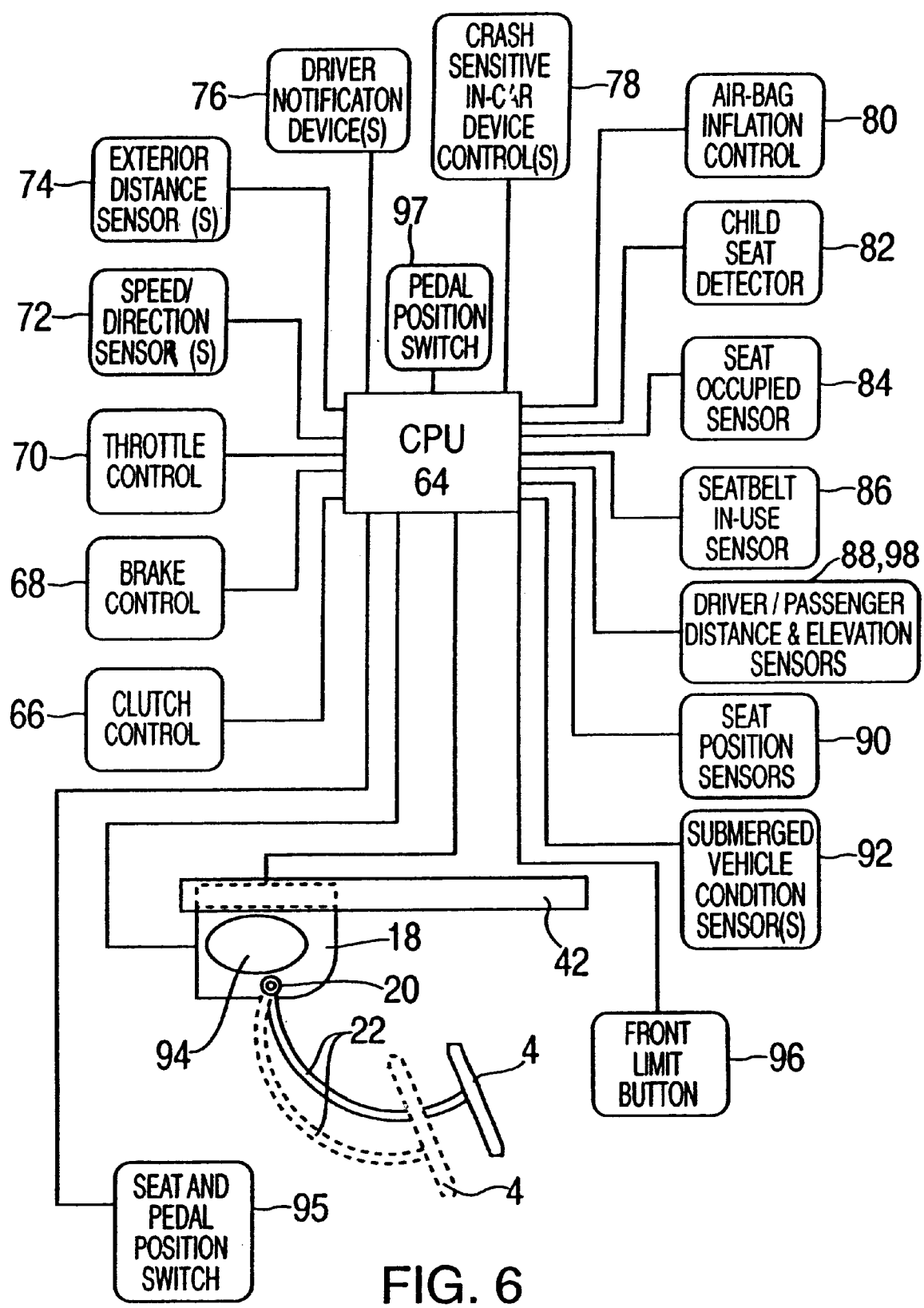
FIG. 6 shows a plan diagram of a computer controlled vehicle safety according to the examplary embodiment and/or exemplary method of the present invention.

As shown in FIG. 6, an adjustable pedal position mechanism as in FIG. 5, may be integrated into a computerized vehicle safety system operated by a CPU 64 which may be part of an on-board microprocessor controlling various vehicle functions.

The CPU 64 is coupled to a multiplicity of vehicle control devices including, for example, a clutch control 66, a brake control 68, a throttle control 70, operating condition sensors including, for example, speed and direction sensors 72 and exterior distance sensors 74. In addition, the CPU 64 is coupled to vehicle safety components including, for example, driver notification devices 76; crash sensitive in-car device controls 78 which may, for example, control door and seat belt unlocking, window opening, motor shut-off, placement of 911 calls; and an air-bag inflation control system 80; and sensors supplying information to the vehicle safety system including, for example, a child seat detector 82, a seat occupied sensor 84, a seat belt in use sensor 86, driver/passenger distance and elevation sensors 88, 98, seat position sensors 90 and submerged vehicle condition sensors 92. The occurrence of a crash may be detected, for example, by the acceleration or other sensors used to activate the air-bags, roll-over sensors, etc.

An alternative pedal position adjustment mechanism of FIG. 6 is substantially identical to the pedal position adjustment apparatus described in the previous embodiments except that instead of the cable coupled to an actuator via a first fixed pulley and a second movable pulley, a sensor 94 detects a degree of rotation of each of the pedals 4 about the axle 20. Each sensor 94 supplies an output signal corresponding to the angular position of the corresponding pedal 4 to the CPU 64 which supplies a corresponding control signal to a vehicle control device corresponding to the particular pedal 4.

The computerized vehicle safety system of FIG. 6 may allow adjustment of both seat and pedal position through operation of a single switch 95 corresponding to currently employed seat position switches, but may be pre-programmed to prevent the driver from adjusting the seat to a position within the minimum safe clearance. As the driver operates the switch 95 to request a forward motion of the seat 2, the CPU 64 operates the servo motor to direct a forward motion of the seat 2 until the driver reaches the minimum safe clearance (as determined by either a driver position sensor or a pre-set forward-most seat position). The CPU 64 then halts the forward motion of the seat 2 locking the seat 2 in the forward-most position and begins moving the pedals 4 toward the driver until the driver indicates that a desired position of the pedals 4 has been achieved. The CPU 64 then directs the adjustable pedal position mechanism to lock the pedals 4 in the desired position. Alternatively, the system of FIG. 6 may also include a separate pedal position switch 97 allowing the passenger to adjust the position of the pedals 4 regardless of the current position of the seat 2.

As described above, an exemplary embodiment of the present invention may use, as an alternative to a predetermined forward-most seat position based on a minimum adult chest depth, an electronic passenger distance sensor 88 to monitor, such as, for example, chest to air-bag distance. The CPU 64 then monitors the chest to air-bag distance and controls motion of the seat 2 and the pedals 4 to maintain the minimum safe clearance. Upon detecting the minimum safe distance has been achieved, forward seat motion is halted and all further motion request of the driver is transferred to the servo motor 62. In addition, although the seat is prevented from moving forward beyond the minimum safe clearance, if a driver or passenger moves his body relative to the seat to temporarily encroach beyond the minimum safe clearance, the CPU 64 may control the air-bag inflation control 80 to cause it to operate in a reduced clearance mode in which, under predetermined conditions, the system may, for example, reduce an inflation pressure, disable the air-bag or deploy the air-bag in staged inflation until the driver or passenger returns beyond the minimum safe clearance. When the driver has returned beyond the minimum safe clearance, the system discontinues the reduced clearance mode operation.

Upon an adjustment for rear movement of the seat 2 being called for, the CPU 64 directs operation in reverse of that employed for forward motion of the seat 2. That is, when the servo motor 62 is operated to retract the pedals 4 (toward the front of the vehicle), until the forward-most position of the pedals 4 is reached. Then CPU 64 directs additional distance adjustments by moving the seat 2 rearward.

An optional front limit button 96 permits a driver to select as a personal forward-most position, any position of the seat 2 in which the passenger seated therein is separated from the air-bag by at least the minimum safe clearance and to make adjustments for leg length by moving the pedals 4 rearward. This allows drivers of all sizes to take advantage of a more rearward pedal position thereby reducing the possibility of lower limb injury.

The present design of "seat slide only" adjustment has also resulted in visual limitations to drivers of small stature as shorter drivers stretch to reach the pedals 4. This need to stretch in turn limits the amount of seat elevation that can be physically used.

It is believed, however, that rearward adjustment of the position of the pedals 4 offered by the exemplary embodiment of the present invention may eliminate such stretching, and may allow a full range of seat elevation to be employed by all drivers regardless of height, permitting all to obtain optimum design eye level.

An elevation sensor 98 may be coupled to the CPU 64 positioned within the passenger compartment to detect an actual height of a driver's head. The elevation sensor 98 may employ technology such as ultrasonic sensors similar to sensors included in commercially available distance meters. Using a standard value representing an average difference between a height of the top of a person's head and their eyes, (such as, for example, 4") an optimum eye elevation position may be automatically obtained as the CPU 64 directs an electric motor (not shown) in the seat 2 to elevate the seat 2 until the elevation sensor 98 indicates that the optimum eye level has been obtained. As shown in FIGS. 1A and 1B, a distance NN1 from the sensor 98 (roof position) to a corresponding to 4 inches below a top of the head is believed to correspond to an optimal or at least a good distance NN2 of the sensor 98 with respect to the top of the head.

Thus, the exemplary embodiment of the present invention provides an automatic driver seat positioning system (DPS), which uses both front and elevation sensors to automatically position the driver in an optimum visual and air bag protection position.

Although the described exemplary embodiments show overhead or dashboard slung foot pedals and a pedal position adjustment mechanism adapted thereto, the exemplary embodiments and/or exemplary methods of the present invention may also be applied in vehicles with floor mounted pedals or other pedal mounting arrangements, so long as a combination of pedal movement and seat movement is provided to ensure that a minimum safe clearance between the driver or other passenger and an air-bag is maintained. In addition, though the described embodiments and examples refer to driver seat control and a steering wheel located air-bag, the same concepts may be applied to other passenger seating and air-bag arrangements to maintain a minimum safe clearance between the passenger and the air-bag.

As indicated in FIG. 6, the CPU 64 may be coupled to a plurality of vehicle systems to create an integrated vehicle safety system. Specifically, in addition to controlling the air-bag system and the seat and pedals to maintain a minimum safe clearance, the system of FIG. 6 may include, for example, sensors for determining whether a child seat is mounted on a particular seat, whether a particular seat belt is in use, the position of the seats, whether a vehicle is submerged or in another post-crash situation and systems for disabling the ignition of the vehicle after an accident, for automatically lowering the windows in a submerged vehicle situation, for unlocking the doors and unfastening the seat belts after an accident and for operating a cell phone and/or navigation system to make a call to 911.

The driver/passenger distance sensors 88 offer a practical method of controlling the inflation of multi stage and/or controlled inflation air-bags, when so equipped. Thus, for example, when the distance sensor 88 indicates that the minimum safe distance has been encroached upon, the corresponding air-bag would be activated at a reduced inflation rate. An optimum air bag inflation activation and rate may be continuously computed by the CPU 64 based upon input from sensors 72, 74, 82, 84, 86 and 88.

For example, encroachment beyond the minimum safe clearance, or the detection of a low speed impact, based upon exterior distance sensors 74 and vehicle speed, would initiate a lower inflation setting for the related air-bag. Thus, the system is further enhanced by interfacing with other systems that detect seat occupancy and/or active seat belt use, providing a continuous basis of multi-factor safe inflation evaluation.

It is believed that present foot pedal designs may vary considerably by auto manufacturer, and may therefore use cable control or rod control of gas, brake and clutch. In the exemplary embodiment, all of the foot pedals may be mounted on a single sliding platform located under dash, supported from the firewall and/or dash, and activated by either manual or motorized control as described above.

Combined with motorized control, the vehicle safety system of FIG. 6 may employ the sensors 98 and 88 to provide automatic, optimized driver positioning, regardless of weight or height.

This customized driver positioning system may be implemented by the CPU 64 by, for example, activating seat/pedal position control in the following 3 steps: (1) The seat 2 is first returned to its lowest and rearward-most position; (2) After step 1 has been achieved, the seat 2 is then elevated to its optimum eye level position, that is, the point at which the distance indicated by elevation sensor 98 equals an optimum distance stored in memory; and (3) After steps 1 and step 2 have been completed, the seat 2 is advanced to its minimum safe position, the point at which the distance indicated by the distance sensor 88 is equal to a predetermined minimum safe distance stored in memory or, alternatively, by advancing the seat 2 to a preselected forward-most position.

These steps may be performed in any order. By adjusting the eye height first, however, this should eliminate or at least reduce inaccuracies in detecting the distance between the passenger and the air-bag that may result from the varying contour of the passenger (that is, some portions of the passengers anatomy may project further forward than others). Thus, if horizontal positioning is performed first, a later change in vertical position may alter the critical distance between the sensed portion of the passenger and the air-bag.

The driver would then adjust the pedals 4 to the most comfortable position by further activating the seat position activator.

Figure 8:
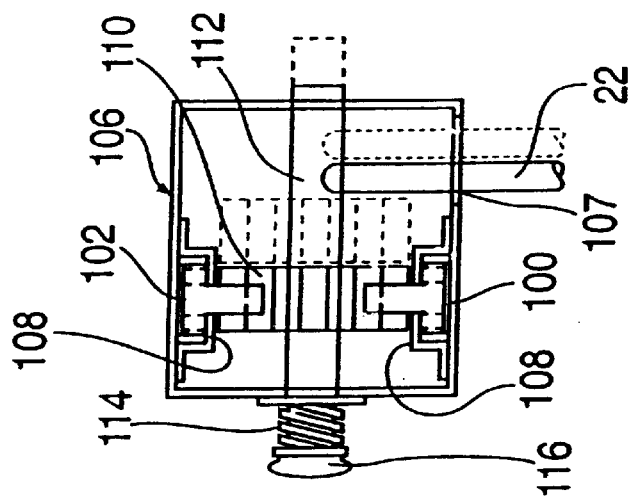
FIG. 8 shows a cross-sectional view of the pedal position adjustment mechanism of FIG. 7A and/or FIG. 7B taken on a plane perpendicular to that of FIG. 7A and/or FIG. 7B.
Figure 7A:
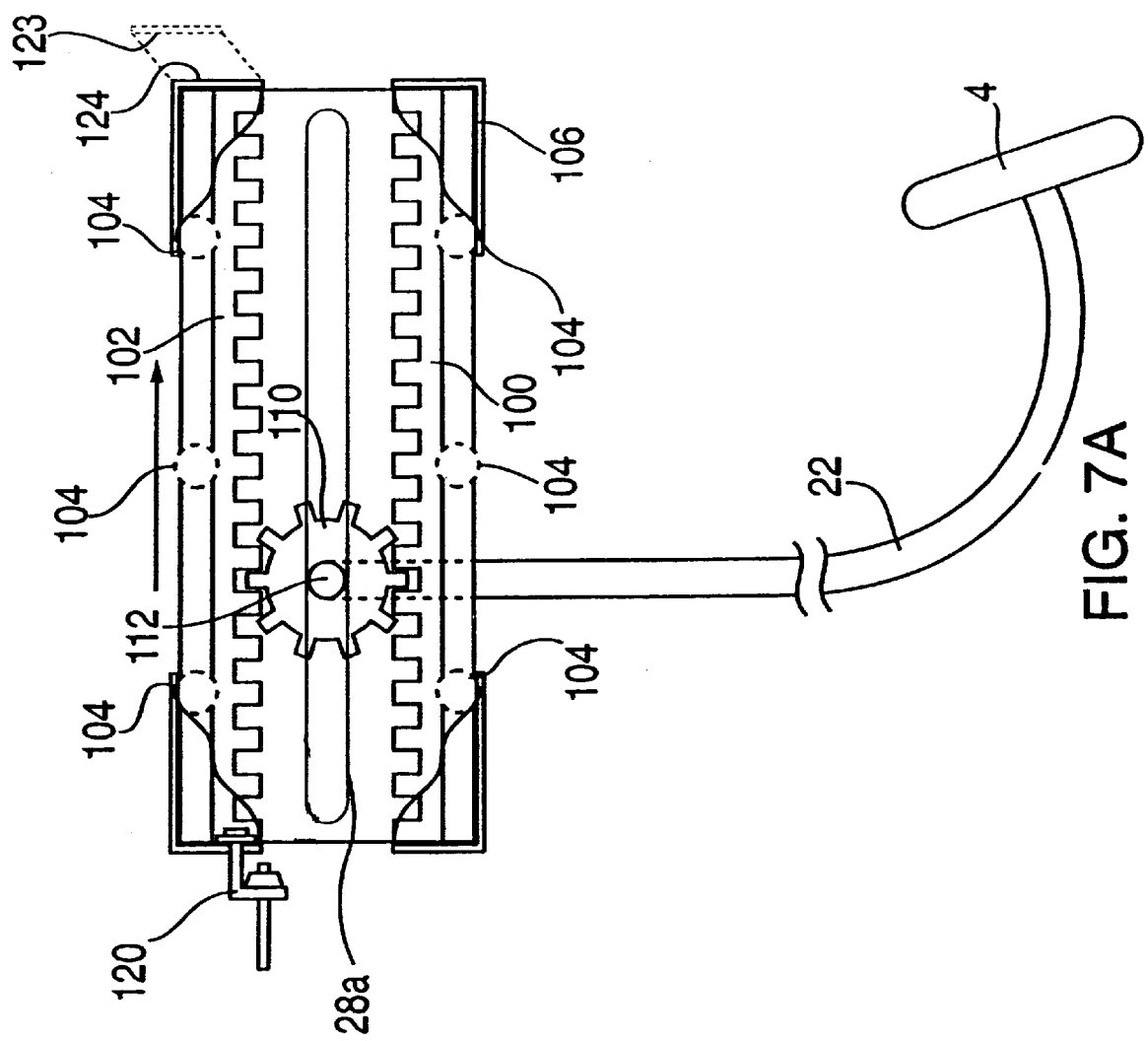
FIG. 7A shows a partially cross-sectional side view of a fourth pedal position adjustment apparatus for use with the first exemplary embodiment of the present invention.
Figure 7B:
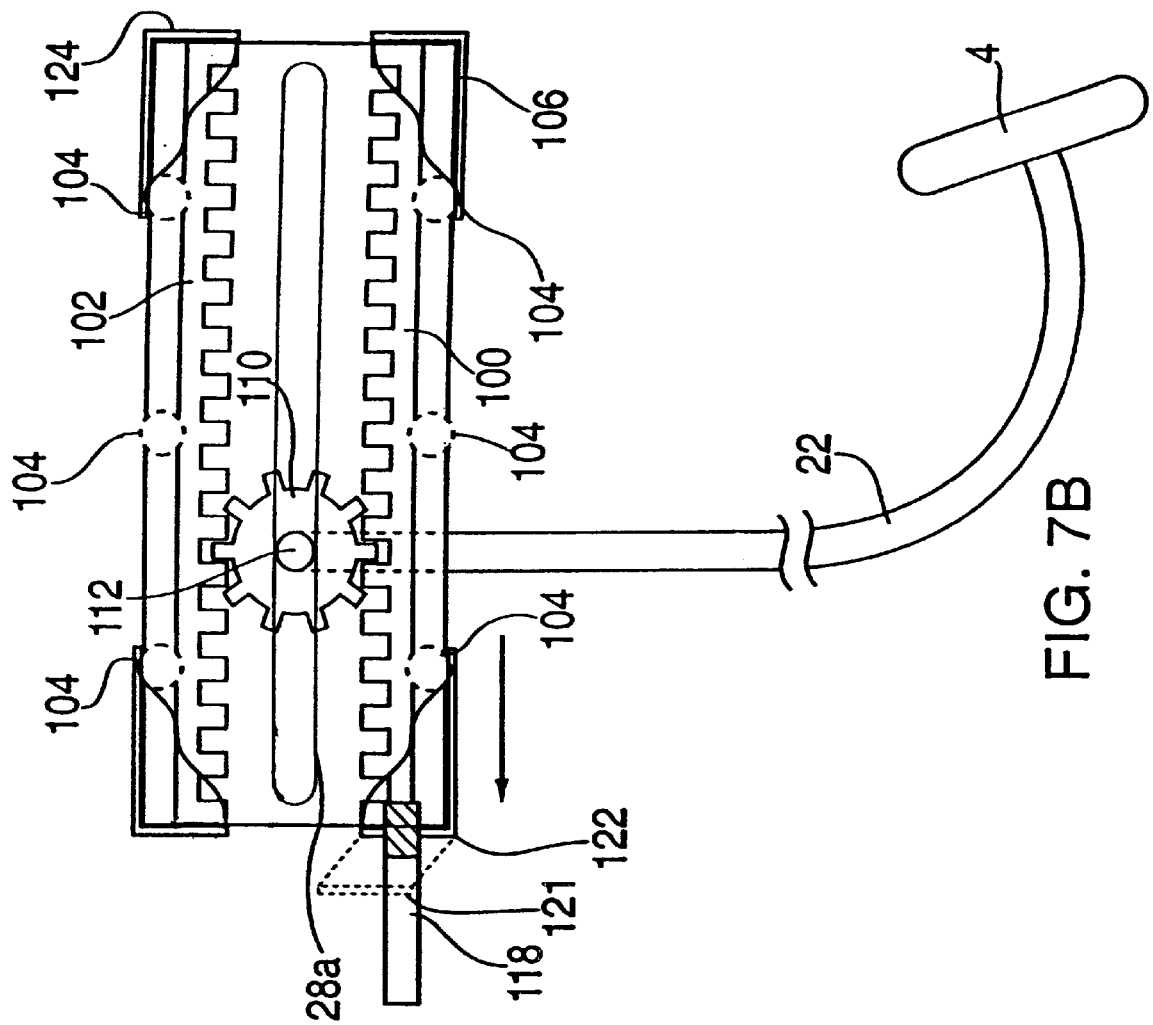
FIG. 7B shows a partially cross-sectional side view of another exemplary fourth pedal position adjustment apparatus for use with the first exemplary embodiment of the present invention.

FIGS. 7A, 7B and 8 show an alternative adjustable pedal position mechanism which eliminates the cable and pulley arrangements of FIGS. 2 and 3. Specifically, the adjustable pedal position mechanism of FIGS. 7A, 7B and 8 includes geared slides 100, 102 mounted on rollers 104 and mounted within a housing 106. The geared slides 100, 102 are maintained in position within the housing 106 by guides 108 with a circular gear 110 mounted therebetween. The circular gear 110 is non-rotatably coupled to the pedal rod 22 which extends into the housing 106 via an opening 107 and, consequently, to the pedal 4 by a pin 112 which rides in slots or channels 28a formed in opposed walls of the housing 106. The circular gear 110 is held in an engaged position between the geared slides 100,102 in which teeth of the circular gear 110 engage teeth of the slides 100, 102 by the bias of a spring 114 which abuts a knob 116 which extends out of the housing 106. The knob 116 is mounted on the pin 112 so that, when the knob 116 is pushed toward the housing 106 against the bias of spring 114, the circular gear 110 is moved to a disengaged position in which the teeth of the circular gear are out of engagement with the teeth of the slides 100,102.

Thus, by depressing the knob 116, the circular gear 110 and the pedal 4 can be slid to any position along the length of housing 106. Upon releasing the knob 116, the teeth of the circular gear 110 again engages the teeth of slides 100, 102 and the pedal 4 is locked in a new position. When the pedal 4 is depressed, the pedal rod 22 rotates the circular gear 110 (clockwise as seen in FIGS. 7A and 7B) which can cause either the slide 100 to slide forward (to the left in FIG. 7B) or the slide 102 to slide rearward (to the right in FIG. 7A) depending on which of stops 121 and 123 has been removed. In particular, as shown in the appropriate Figures, stop 123 is removed for the cable pull arrangement of FIG. 7A, and stop 121 is removed for the push rod arrangement of FIG. 7B. The force applied by the pedal 4 to the slides 100, 102 may be applied by the slide 100 to a push rod connector 118, as in FIG. 7B, or by the slide 102 to a pull cable 120, as in FIG. 7A, and that this force may then be transmitted to an actuator for a corresponding vehicle control device.

One of removable stops 121, 123 is thus used at the respective corner 122, 124 to allow either pull cable or push rod control action selection. For example, removal of stop 121 directs all pedal motion to a forward motion of slide 100 using a rod connector 118 while removal of stop 123 directs all pedal motion to a rearward motion of slide 102 which uses a cable connector 120.

As with the exemplary embodiments described above, although manual adjustment has been described in regard to the adjustable pedal position mechanism of FIGS. 7A, 7B and 8, motorized control would provide similar action and could be implemented with similar structure. In addition, the exemplary embodiment of the present invention is compatible with any alternative mechanisms for using pedal motion to operate a vehicle control device (such as, for example, hydraulic systems).

While a separate motor may be used for the foot pedal track, it could also be accomplished by direct connection to the seat drive, such as in a cable shaft drive common to speedometers. While overhead slung pedals are shown, floor mounted pedals are intended to have similar controls.

Similar seat and distance sensors are suggested for other air bag protected passengers, to maintain a safe air-bag distance. These distance detectors could be set to halt forward seat movement and issue an audible and/or visible warning when the minimum safe distance is encroached upon.

In addition, braking and accelerator controls may be further monitored and acted upon by the CPU 64 based upon input from the Exterior Distance Sensors 74 in conjunction with Speed and Direction Sensors 72. For example, if the Speed and Direction sensors 72 and related Exterior Distance Sensors 74 detect imminent impact, additional braking forces may be activated via brake control 68.

All safety threats detected by the CPU 64 may also be conveyed to the driver by an audio and/or visual alert system.

The examples of distances such as the minimum safe clearance from an air-bag are discussed throughout this specification, but these distances may vary on a case-by-case basis. In addition, the above-described embodiments are only exemplary and there are variations and modifications of the disclosed exemplary embodiments and/or exemplary method. These variations and modifications are considered to be within the scope of the claimed inventions.

What is claimed:

1. A vehicle safety device comprising:

a first air-bag mounted within a passenger compartment of a vehicle; and a first seat mounted within the passenger compartment, the first seat being movably connected to a frame of the vehicle by a first seat position adjusting mechanism, the first seat position adjusting mechanism allowing the first seat to move relative to the first air-bag along a first axis between a forward-most position and a rearward-most position, the forward-most position being defined as a position of the first seat in which a distance between a passenger seated in the first seat and the first air-bag is equal to a minimum safe clearance, displacement of the first seat away from the forward-most position increasing the distance between the first seat and the first air-bag;

wherein:

the first air-bag is fixedly positioned with respect to one of a steering wheel assembly for a driver and a dashboard arrangement for a passenger other than the driver; and the first seat position adjusting mechanism includes a seat position switch so that actuation of the seat position switch causes a corresponding motion of the first seat using a control unit.

2. The vehicle safety device according to claim 1, wherein the control unit includes a computer, further comprising:

a distance sensor which detects a distance between a passenger seated in the first seat and the first air-bag, the distance sensor being coupled to the computer;

wherein the computer determines the location of the forward-most position of the first seat so that, when the first seat is in the forward-most position, a distance between a passenger seated in the first seat and the first air-bag is equal to the minimum safe clearance.

3. The vehicle safety device according to claim 2, further comprising a pedal mount to which at least one vehicle control pedal is mounted, wherein, when the first seat is in the forward-most position, upon actuation of the seat position switch to request forward motion of the first seat, the pedal mount is movable toward the first seat.

4. The vehicle safety device according to claim 3, further comprising a memory in which preferred first seat and pedal mount positions are stored.

5. The vehicle safety device according to claim 3, further comprising an override switch which allows a passenger to select a personal forward-most position so that, when the first seat is in the personal forward-most position, actuation of the seat position switch to request further forward motion of the first seat initiates rearward motion of the at least one vehicle control pedal.

6. The vehicle safety device according to claim 2, further comprising a pedal switch, operation of the pedal switch causing a corresponding motion of a pedal mount.

7. The vehicle safety device according to claim 2, wherein the first seat is movable vertically.

8. The vehicle safety device according to claim 7, further comprising a height sensor for sensing a height of eyes of a passenger in the first seat, wherein the height sensor is coupled to the computer for use in moving the first seat vertically until an optimum eye height is achieved.

9. The vehicle safety device according to claim 2, wherein, when the distance sensor indicates that a passenger seated in the first seat has encroached within the minimum safe clearance, the computer controls operation of the first air-bag in a reduced clearance mode.

10. The vehicle safety device according to claim 9, wherein the reduced clearance mode, the computer prohibits deployment of the first air-bag.

11. The vehicle safety device according to claim 9, wherein in the reduced clearance mode, the computer reduces an inflation pressure of the first air-bag.

12. The vehicle safety device according to claim 9, wherein in the reduced clearance mode, the computer directs staged inflation of the air-bag.

13. A vehicle safety device comprising:
  a first air-bag mounted within a passenger compartment of a vehicle; and
  a first seat mounted within the passenger compartment, the first seat being movably connected to a frame of the vehicle by a first seat position adjusting mechanism, the first seat position adjusting mechanism allowing the first seat to move relative to the first air-bag along a first axis between a forward-most position and a rearward-most position,
  the forward-most position being defined as a position of the first seat in which a distance between a passenger seated in the first seat and the first air-bag is equal to a minimum safe clearance, displacement of the first seat away from the forward-most position increasing the distance between the first seat and the first air-bag;
  wherein the first seat is movable vertically, and the first air-bag is fixedly positioned with respect to one of a steering wheel assembly for a driver and a dashboard arrangement for a passenger other than the driver.

14. The vehicle safety device according to claim further comprising:
  a height sensor for sensing a height of eyes of a passenger in the first seat; and
  a seat position controller for use in moving the first seat vertically until an optimum eye height is achieved.

15. A vehicle safety device comprising:
  a first air-bag mounted within a passenger compartment of a vehicle;
  a first seat mounted within the passenger compartment, the first seat being movably connected to a frame of the vehicle by a first seat positiQn adjusting mechanism, the first seat position adjusting mechanism allowing the first seat to move relative to the first air-bag along a first axis between a forward-most position and a rearward-most position, the forward-most position being defined as a position of the first seat in which a distance between a passenger seated in the first seat and the first air-bag is equal to a minimum safe clearance, displacement of the first seat away from the forward-most position increasing the distance between the first seat and the first air-bag; and
  a height sensor to sense a position of a portion of a passenger seated in the first seat corresponding to a height of the eyes of the passenger;
  wherein:
    the first air-bag is fixedly positioned with respect to one of a steering wheel assembly for a driver and a dashboard arrangement for a passenger other than the driver, and
    the height sensor is operable to provide data for use by a control unit for use in vertically adjusting a height of the first seat to attain an optimum eye height of a passenger seated in the first seat.

16. A vehicle safety device comprising:
  a first air-bag mounted within a passenger compartment of a vehicle;
  a first seat mounted within the passenger compartment, the first seat being movably connected to a frame of the vehicle by a first seat position adjusting mechanism, the first seat position adjusting mechanism allowing the first seat to move relative to the first air-bag along a first axis between a forward-most position and a rearward-most position,
  the forward-most position being defined as a position of the first seat in which a distance between a passenger seated in the first seat and the first air-bag is equal to a minimum safe clearance, displacement of the first seat away from the forward-most position increasing the distance between the first seat and the first air-bag; and
  a distance sensor to sense a position of a passenger seated in the first seat corresponding to a distance between the passenger and the first air-bag;
  wherein:
    the first air-bag is fixedly positioned with respect to one of a steering wheel assembly for a driver and a dashboard arrangement for a passenger other than the driver, and
    the distance sensor is operable to provide data to a control unit for use in horizontally moving the first seat along the first axis until the distance sensor indicates that the first seat is in the forward-most position.

17. A vehicle safety device comprising:
  a first air-bag mounted within a passenger compartment of a vehicle;
  a first seat mounted within the passenger compartment, the first seat being movably connected to a frame of the vehicle by a first seat position adjusting mechanism, the first seat position adjusting mechanism allowing the first seat to move relative to the first air-bag along a first axis between a forward-most position and a rearward-most position, the forward-most position being defined as a position of the first seat in which a distance between a passenger seated in the first seat and the first air-bag is equal to a minimum safe clearance, displacement of the first seat away from the forward-most position increasing an actual distance between the first seat and the first air-bag;

a pedal position adjusting mechanism for moving at least one pedal toward and away from the first seat, the first seat being a driver seat;

a distance sensor for use in determining the actual distance and for providing it to a control unit for defining the forward-most position based on a distance between a passenger seated in the first seat and the first air-bag; and a passenger notification device coupled to the control unit for notifying the passenger, when the passenger moves forward within the minimum safe clearance, that the minimum safe clearance has been encroached upon;

wherein the first air-bag is fixedly positioned with respect to one of a steering wheel assembly for a driver and a dashboard arrangement for a passenger other than the driver.

18. A method of maintaining a minimum safe clearance between an air-bag mounted in a vehicle and a vehicle passenger to be protected by the air-bag, wherein the vehicle includes a seat which may be moved toward and away from the air-bag, the method comprising the steps of:

limiting motion of the seat toward the air-bag to prevent motion of the seat beyond a forward-most position wherein, when in the forward-most position, a passenger seated in the seat is separated from the air-bag by a predetermined minimum safe clearance; and adjusting a position of at least one vehicle control pedal to achieve a desired distance between the seat and the at least one pedal;

wherein:

the air-bag is fixedly positioned with respect to one of a steering wheel assembly for a driver and a dashboard arrangement for a passenger other than the driver; and the vehicle includes a computer and a sensor for detecting a distance between a passenger seated in the seat and the air-bag, the step of limiting motion of the seat being performed to prohibit further forward directed movement of a seat when the sensor indicates that the distance between a passenger seated in the seat and the air-bag is equal to the minimum safe clearance.

19. The method according to claim 18, wherein the vehicle further includes a pedal moving arrangement for moving the at least one pedal toward and away from the seat, the method further comprising the step of:

operating the pedal moving arrangement to move the at least one pedal rearward toward the seat while the seat is in the forward-most position.

20. The method according to claim 18, further comprising the step of:

preventing the air-bag from deploying when the sensor indicates that a passenger seated in the seat has encroached within the minimum safe clearance.

21. The method according to claim 18, further comprising the step of:

reducing an inflation rate of the air-bag when the sensor indicates that a passenger seated in the seat has encroached within the minimum safe clearance.

22. The method according to claim 18, further comprising the step of:

inflating the air-bag in stages when the sensor indicates that a passenger seated in the seat has encroached within the minimum safe clearance.

* * * * *

UNITED STATES PATENT AND TRADEMARK OFFICE
CERTIFICATE OF CORRECTION

PATENT NO.    : 6,634,669 B2
DATED         : October 21, 2003
INVENTOR(S)   : Levine, Richard W.

It is certified that error appears in the above-identified patent and that said Letters Patent is hereby corrected as shown below:

Column 6,
Line 45, change "the" to -- a --; (second occurrence)

Column 7,
Line 55, change "to a corresponding to" -- to a point corresponding to --;

Column 9,
Line 49, change "cable 120, as in FIG. 7A, and that this" to -- cable connector 120, as in FIG. 7A, and this --;

Column 11,
Line 62, change "claim" to -- claim 13 --;

Column 12,
Line 7, change "positiQn" to -- position --.

Signed and Sealed this

Seventeenth Day of August, 2004

JON W. DUDAS
*Acting Director of the United States Patent and Trademark Office*